United States Patent [19]
Sung

[11] Patent Number: 5,931,327
[45] Date of Patent: Aug. 3, 1999

[54] FUEL BACKFLOW-PREVENTING DEVICE FOR USE IN AN AUTOMOTIVE VEHICLE

[75] Inventor: Younkwan Sung, Ulsan, Rep. of Korea

[73] Assignee: Hyundai Motor Company, Inc., Seoul, Rep. of Korea

[21] Appl. No.: 08/891,161

[22] Filed: Jul. 10, 1997

[51] Int. Cl.[6] ................................ B65B 3/00; H02G 3/22
[52] U.S. Cl. ......................................... 220/86.2; 277/607
[58] Field of Search ................... 220/86.2, 86.3; 277/607; 141/197, 198

[56] References Cited

U.S. PATENT DOCUMENTS

| | | | |
|---|---|---|---|
| 4,822,054 | 4/1989 | Christner et al. | |
| 4,974,645 | 12/1990 | Johnson | 220/86.2 X |
| 5,348,177 | 9/1994 | Sung . | |
| 5,568,828 | 10/1996 | Harris | 220/86.2 X |

*Primary Examiner*—Anthony Knight
*Assistant Examiner*—Gary Grafel
*Attorney, Agent, or Firm*—Birch, Stewart, Kolasch & Birch, LLP

[57] ABSTRACT

A fuel backflow-preventing device for use in a vehicle, which includes a fuel tank containing an inlet conduit, a floating device slidably disposed within the inlet conduit and operative to seal the inlet conduit, and spring means operatively associated with the floater device and biased to effect the sealing of the inlet conduit.

3 Claims, 3 Drawing Sheets

FUEL BACKFLOW-PREVENTING DEVICE FOR USE IN AN AUTOMOTIVE VEHICLE

BACKGROUND OF THE INVENTION

1. Field of the Invention

The present invention relates to a fuel backflow-preventing device for use in a vehicle. More particularly, the present invention is directed to a fuel backflow-preventing device for preventing injected fuel from being expelled back from the fuel tank due to a rise in the pressure in the fuel tank at the time of supplying fuel to the fuel tank.

2. Description of Related Art

Various types of fuel backflow-preventing devices for use in a vehicle are known in the art. Generally, a fuel tank installed in an automotive vehicle is disposed at a lower part of the vehicle, and the inlet to the fuel tank for supplying fuel thereto is positioned higher than the fuel tank. The fuel that passes through the inlet flows into the fuel tank at a very fast rate which causes the pressure of the air present in the fuel tank to increase by overfilling the fuel tank.

The rise of the pressure inside the fuel tank may cause "burping," a condition whereby small portions of the fuel are expelled back through the filler tube inlet.

A method of preventing "burping" at the time of supplying fuel to a fuel tank is disclosed in U.S. Pat. No. 4,822,054.

As shown in FIG. 1, a conventional fuel backflow-preventing device for use in a vehicle, includes a inlet fuel conduit 31, a pair of guide holes 32 disposed at both sides of the inlet fuel conduit 31, and a cone-shaped floater 34 having a pair of guide plates 33 for slidably engaging with the pair of guide holes, whereby when the fuel volume is small in the fuel tank, the floater 34 descends in the downward direction as shown in FIG. 1 in an actual inlet conduit line. When the fuel volume is increased in the fuel tank, the floater 34 ascends as shown by the dotted line. At this time, although the floater 34 blocks the inlet conduit 31, some fuel will still leak out since it is difficult to tightly block the inlet fuel conduit 31 due to the liquid and vapor pressure from the fuel tank.

In order to avoid these problems, U.S. Pat. No. 5,348,177, which issued to the present inventor, disclosed a fuel backflow-preventing device for use in an automotive vehicle comprising a inlet fuel conduit and a fuel tank; a guide member connected to an inside portion of the inlet fuel conduit having a plurality of slits and a plurality of passages; a floater member having projections slidably engaged in the slits, whereby the floater can rise in the inlet conduit to block the passage in said conduit; and a coupling means for connecting the inside portion of the inlet fuel conduit lengthwise with the guide member.

However, such a conventional fuel backflow-preventing device suffers from a number of problems. For example, the cone-shaped floater cannot tightly block the inlet fuel conduit since the oppositely directed pressure from the inlet fuel conduit is strong. Thus, if the guide holes and guide plates are not in proper alignment, the floater cannot operate to block the inlet fuel conduit. Also, the conventional devices are complicated in structure, expensive to manufacture, and difficult to assemble.

SUMMARY OF THE INVENTION

Accordingly, it is an object of the present invention to provide a fuel backflow-preventing device for use in a vehicle, which eliminates the above problems encountered with conventional fuel backflow-preventing devices.

Another object of the present invent:-on is to provide a fuel backflow-preventing device for use in an automotive vehicle for effectively preventing fuel from being expelled backwards due to an increase in the volume and pressure of fuel inside the fuel tank, by blocking the inlet to the inlet fuel conduit after the fuel has been supplied to the fuel tank.

A further object of the present invention is to provide a fuel backflow-preventing device for a vehicle which includes a guide cover having a guide boss, a conical hat-shaped floater having a shaft which is slidably disposed in the guide boss, and a spring which biases the floater to close the inlet conduit, whereby the introduction of the fuel to the fuel tank pushes the floater to the open position against the bias of the spring and when the fuel tank becomes full and the introduction of the fuel is reduced or discontinued, the pressure of the rising fuel, fuel vapor and the spring pushes the floater strongly to tightly block the inlet fuel conduit.

Still another object of the present invention is to provide a fuel backflow-preventing device for a vehicle which is simple in structure, inexpensive to manufacture, and durable in use.

Other objects and further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Briefly described, the present invention is directed to a fuel backflow-preventing device for use in a vehicle which includes an inlet fuel conduit, a guide cover connected to the fuel inlet conduit through a pair of guide holes, a guide boss supported in the guide cover, a conical hat-shaped floater, and a spring disposed between the guide cover and the floater, whereby when the fuel volume reaches its capacity in the fuel tank, the floater tightly blocks the inlet fuel conduit due to the biasing force of the spring, thereby preventing fuel from leaking from the system.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE PREFERRED EMBODIMENTS

Figure 1:
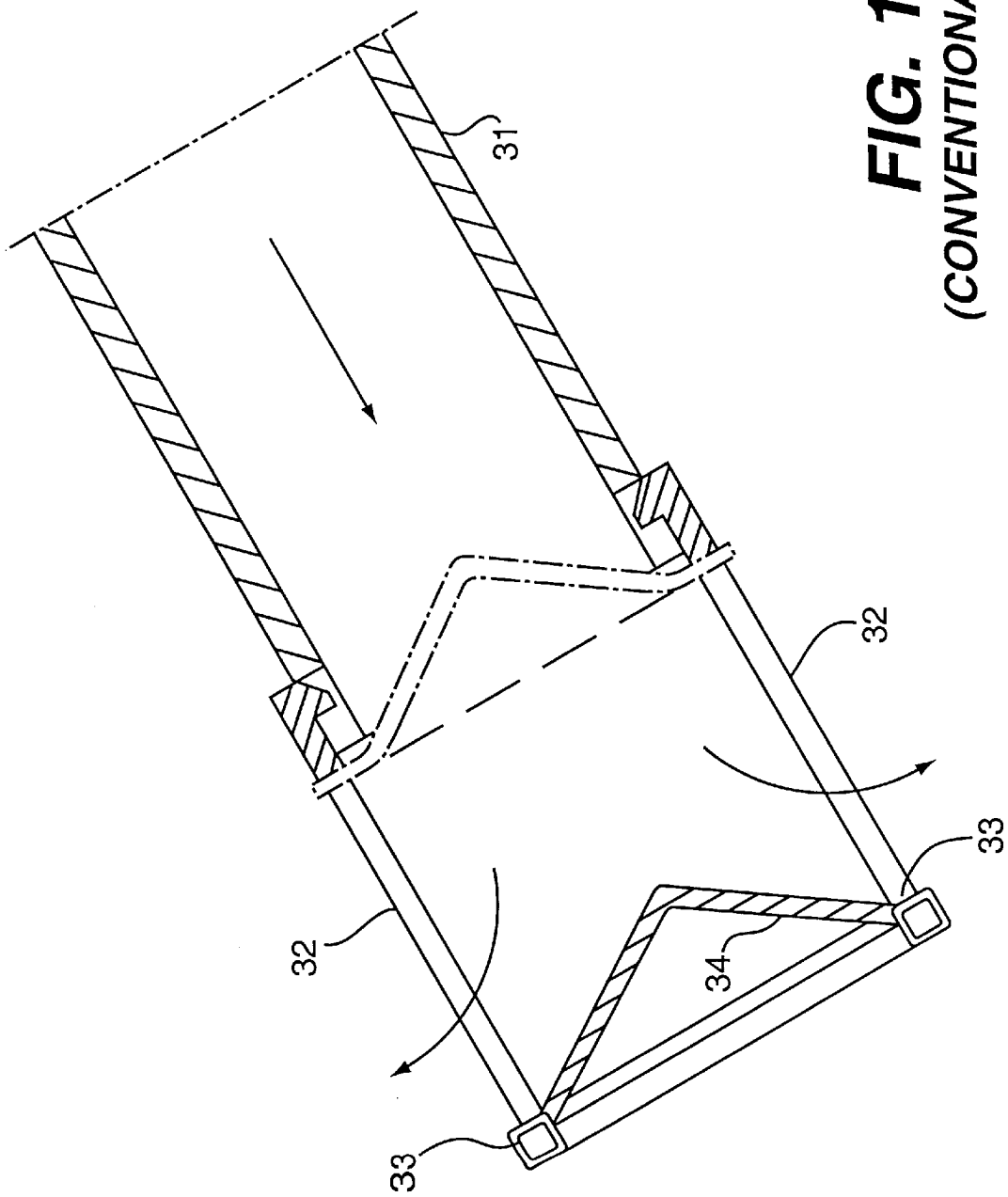
FIG. 1 is a sectional view of a conventional fuel backflow-preventing device for use in a vehicle.
Figure 2:
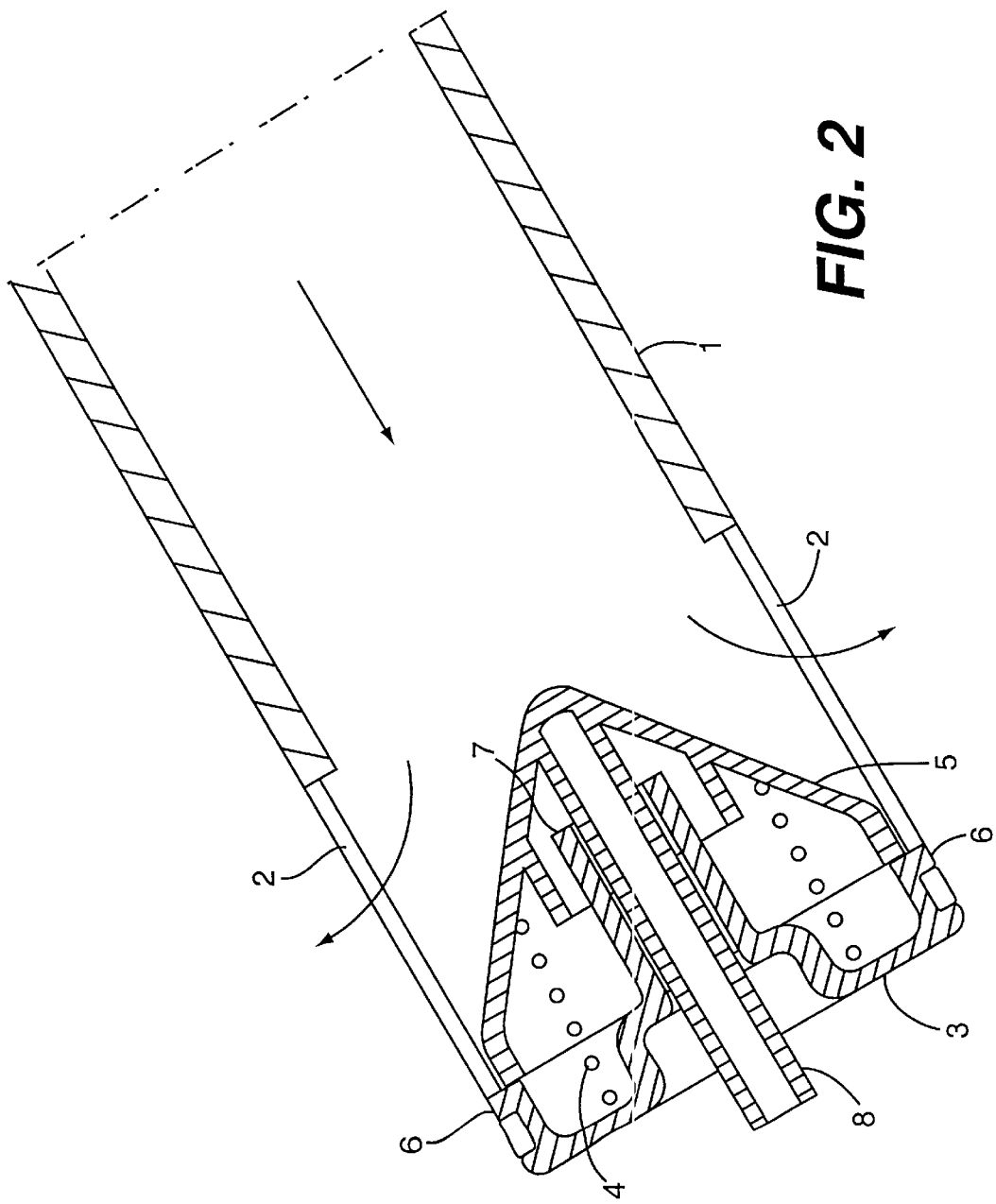
FIG. 2 is a sectional view of the fuel backflow-preventing device for use in a vehicle according to the present invention in the state of introducing fuel into a fuel tank.
Figure 3:
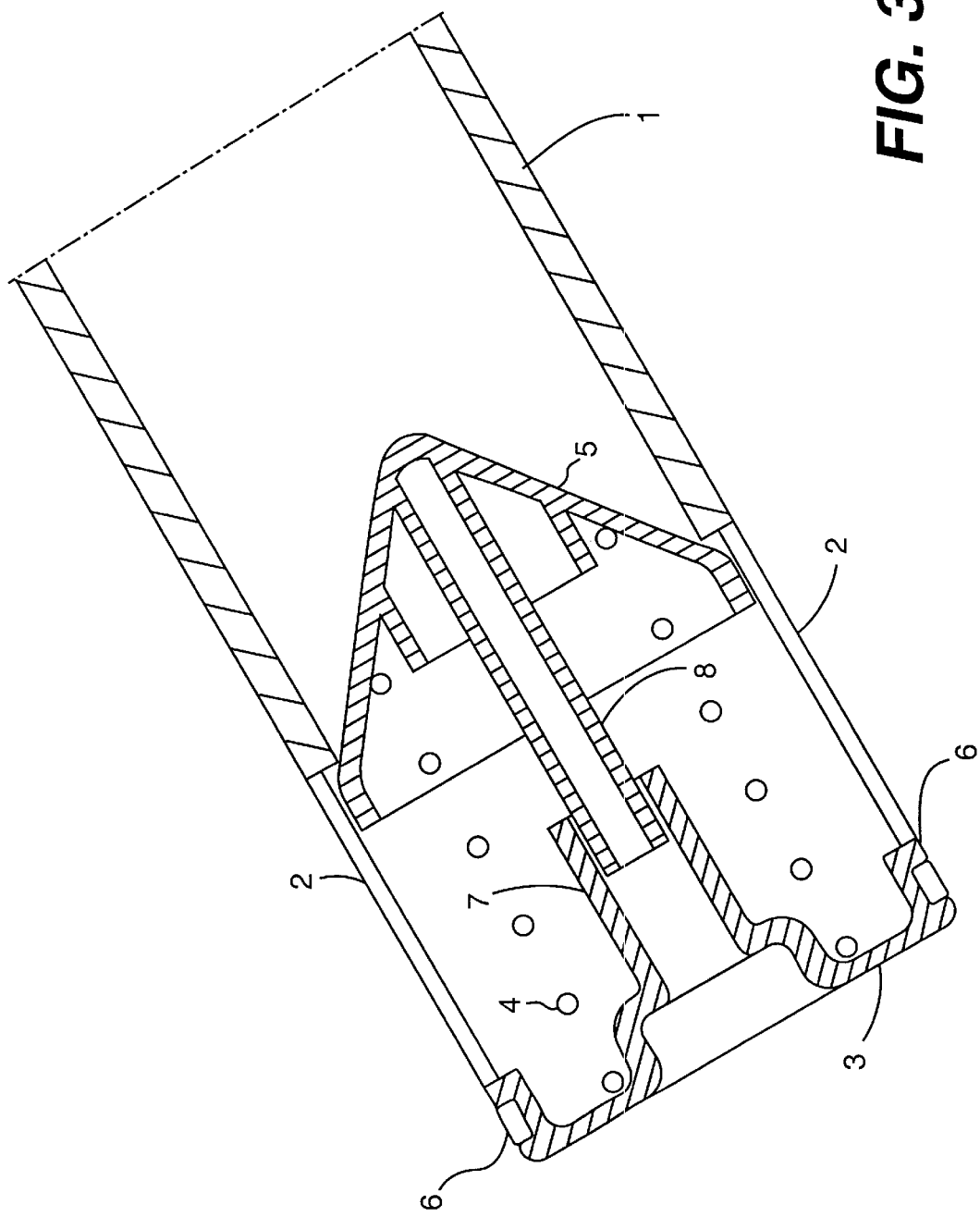
FIG. 3 is a sectional view of the fuel backflow-preventing device for use in a vehicle according to the present invention in a closed position.

Referring now in detail to the drawings for the purpose of illustrating the preferred embodiments of the present invention, the fuel backflow-preventing device for use in a vehicle as shown in FIGS. 2 and 3, comprises an inlet fuel conduit 1, a pair of guide holes 2 disposed at both sides of the inlet fuel conduit 1, a guide cover 3 fixed to the pair of guide holes 2 through a pair of projections 6, a guide boss 7 extending from the guide cover 3, a floater 5 having a shaft 8 positioned to slide within the guide boss 7, and a spring 4 disposed between the guide cover 3 and the floater 5 for strongly pushing the floater 5 and sealing the fuel tank when the fuel tank has been filled.

The floater 5 has a conical, hat-shaped configuration for securely blocking the inlet of the conduit to prevent fuel and fuel vapors from leaking when the filling process has been completed. The guide boss 7 extends from the guide cover 3 towards the top of the floater 5 and the shaft 8 of the floater is slidably disposed within the guide boss 7.

As shown in FIGS. 2 and 3, the fuel backflow-preventing device according to the present invention operates as follows. When the filling of the fuel is initiated, the fuel volume is low in the fuel tank and thus, the floater 5 descends in the downward direction as shown in FIG. 2.

As the fuel volume is increased in the fuel tank, the floater 5 ascends gradually. Eventually, as the fuel tank becomes full, the conical, hat-shaped floater 5 moves up and blocks the inlet fuel conduit. At this time, the pressure of the air has increased inside the fuel tank, making leakage of fuel and vapor an environmental and hazardous problem. However, since the spring 4 is strongly biased against the floater 5, the possible backflow and leakage of fuel and vapor can be eliminated.

As mentioned above, the floater 5 ascends according to the increase in the fuel volume in the fuel tank. Eventually, the inside of the cone configuration separates from the surface of the fuel to form a space above the fuel. Since air or fuel vapor is present in this space, the floater 5 ascends smoothly in the air and is not effected by the buoyancy of the fuel, thereby providing a more secure seal.

In the fuel backflow-preventing device of the present invention, when the fuel is supplied via a dispensing nozzle from a supply reservoir to the fuel tank installed in a vehicle, if the fuel is supplied to a predetermined level, the floater member blocks the passage through which the fuel is supplied. Thus, the backward flow of the fuel is somewhat prevented by the rise of the pressure in the fuel tank. Also, the bias of the spring behind the floater further operates to seal the fuel tank and eliminate possible fuel and vapor discharge.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A fuel backflow-preventing device for use in a vehicle, which comprises:

a fuel tank containing an inlet conduit, said inlet conduit including at least one guide hole, said at least one guide hole permitting fluid flow therethrough, a guide cover containing a guide boss, said guide cover being mounted in said inlet conduit and including at least one projection, said at least one projection penetrating through and contacting a side of said at least one guide hole, said guide cover including an edge contacting an end of said inlet conduit, a floating device slidably disposed within said inlet conduit and operative to seal said inlet conduit and said at least one guide hole, said floating device including a shaft member which is slidably mounted within said guide boss, and spring means operatively associated with said floating device and biased to effect said sealing of the inlet conduit and said at least one guide hole.

2. The fuel backflow-preventing device of claim 1, wherein the spring means is mounted between the guide cover and the floating device.

3. The fuel backflow-preventing device of claim 1, wherein the floating device has a cone-shaped configuration.

* * * * *